(12) United States Patent
Misumi et al.

(10) Patent No.: US 9,803,709 B2
(45) Date of Patent: Oct. 31, 2017

(54) DISK BRAKE DEVICE AND PAIR OF BRAKE PADS

(71) Applicant: TOYOTA JIDOSHA KABUSHIKI KAISHA, Toyota (JP)

(72) Inventors: Ryutaro Misumi, Susono (JP); Toru Matsushima, Machida (JP); Dominic Cote Vaillancourt, Numazu (JP); Yoshitomo Deno, Mishima (JP); Ikuru Konno, Miyoshi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/896,533

(22) PCT Filed: Jun. 20, 2014

(86) PCT No.: PCT/IB2014/001122
§ 371 (c)(1),
(2) Date: Dec. 7, 2015

(87) PCT Pub. No.: WO2014/207530
PCT Pub. Date: Dec. 31, 2014

(65) Prior Publication Data
US 2016/0131208 A1 May 12, 2016

(30) Foreign Application Priority Data

Jun. 27, 2013 (JP) .................................. 2013-135196

(51) Int. Cl.
*F16D 65/00* (2006.01)
*F16D 55/225* (2006.01)
(Continued)

(52) U.S. Cl.
CPC ....... *F16D 65/0006* (2013.01); *F16D 55/225* (2013.01); *F16D 65/092* (2013.01);
(Continued)

(58) Field of Classification Search
CPC .. F16D 55/225; F16D 65/0006; F16D 65/092; F16D 2069/004; F16D 69/00
(Continued)

(56) References Cited

U.S. PATENT DOCUMENTS 3,490,563 A * 1/1970 Heinz ................. F16D 65/0006
188/250 B
5,564,533 A * 10/1996 Parsons ................... F16D 55/22
188/250 E
(Continued)

FOREIGN PATENT DOCUMENTS

DE 2611078 A1 * 9/1977 ............. F16D 55/02
DE 3445349 A1 * 6/1986 ............. B62L 1/005
(Continued)

*Primary Examiner* — Thomas J Williams
(74) *Attorney, Agent, or Firm* — Sughrue Mion, PLLC

(57) ABSTRACT

A disc brake device (1) includes: a disc rotor (2) rotatable around its rotation axis; a pair of brake pads (3, 4) provided opposite to each other on both sides of the disc rotor in an axial direction along the rotation axis; and a pressing mechanism (6) able to press the brake pads against the disc rotor from both sides of the disc rotor with pistons (9) provided opposite to each other on both sides of the disc rotor in the axial direction. Each brake pad has a friction material (7) facing a corresponding friction face (2a) of the disc rotor. The number of slits (10) provided in the friction material of one of the brake pads and not passing through any pressing portions pressed by the pistons is different from the number of slits provided in the friction material of the other one of the pair of brake pads and not passing through any pressing portions.

10 Claims, 12 Drawing Sheets

(51) Int. Cl.
*F16D 65/12* (2006.01)
*F16D 69/00* (2006.01)
*F16D 65/092* (2006.01)

(52) U.S. Cl.
CPC ............. *F16D 65/12* (2013.01); *F16D 69/00* (2013.01); *F16D 2069/004* (2013.01)

(58) Field of Classification Search
USPC .................... 188/250 E, 250 R, 261, 250 B
See application file for complete search history.

(56) References Cited

U.S. PATENT DOCUMENTS

| | | | | |
|---|---|---|---|---|
| 5,706,917 | A | * | 1/1998 | Matsuzaki .......... F16D 65/0979 188/250 D |
| 6,000,506 | A | * | 12/1999 | Warwick .............. F16D 55/228 188/1.11 W |
| 6,119,828 | A | * | 9/2000 | Parsons ................. F16D 65/092 188/250 E |
| 6,206,151 | B1 | * | 3/2001 | Nakamura ............ F16D 65/092 188/73.1 |
| 6,994,190 | B1 | * | 2/2006 | Gotti ................... F16D 55/2262 188/250 E |
| 2012/0080276 | A1 | * | 4/2012 | Kahan .................. F16D 65/092 188/73.1 |
| 2015/0068853 | A1 | * | 3/2015 | Naito .................... F16D 55/225 188/72.4 |

FOREIGN PATENT DOCUMENTS

| | | | | |
|---|---|---|---|---|
| DE | 102004049559 A1 | * | 4/2006 | ............ F16D 65/10 |
| FR | 2305641 A2 | | 10/1976 | |
| GB | 1490303 A | | 11/1977 | |
| GB | 2184179 A | | 6/1987 | |
| JP | 62209235 A | * | 9/1987 | |
| JP | 10-078067 A | | 3/1998 | |

* cited by examiner

DISK BRAKE DEVICE AND PAIR OF BRAKE PADS

BACKGROUND OF THE INVENTION

1. Field of the Invention

The invention relates to a disc brake device and a pair of brake pads.

2. Description of Related Art

For example, a disc brake is described in Japanese Patent Application Publication No. 10-078067 (JP 10-078067 A) as an existing disc brake device mounted on a vehicle. In the disc brake, a large number of through-holes are provided in a rotor, and bleeder slits are provided on a braking face of each brake pad at constant intervals. In this disc brake, where the pitch of the slits is 2t, the pitch of the slits is set to t in the pair of brake pads arranged opposite to each other by setting the slits of each lining offset rightward or leftward by t/2 from the center line of the corresponding brake pad. Thus, t is set so as to be smaller than the diameter d of each through-hole of the rotor. Thus, the disc brake improves braking performance and the durability of each brake lining.

Incidentally, the above disc brake described in JP 10-078067 A still has room for further improvement in terms of suppressing noise, for example, when the disc brake is applied to a piston-opposed caliper-type disc brake device of which the shape of an outer pad and the shape of an inner pad tend to be substantially equivalent quivalent to each other.

SUMMARY OF THE INVENTION

The invention provides a disc brake device and a pair of brake pads that are able to suppress noise during braking.

A first aspect of the invention provides a disc brake device. The disc brake device includes: a disc rotor configured to be rotatable around its rotation axis; a pair of brake pads provided opposite to each other on both sides of the disc rotor with respect to an axial direction along the rotation axis; and a pressing mechanism configured to be able to press the pair of brake pads against the disc rotor from both sides of the disc rotor with use of pistons provided opposite to each other on both sides of the disc rotor with respect to the axial direction. Each of the pair of brake pads has a friction material facing a corresponding one of friction faces of the disc rotor, and the number of slits provided in the friction material of one of the pair of brake pads and not passing through any one of pressing portions that are pressed by the pistons is different from the number of slits provided in the friction material of the other one of the brake pads and not passing through any one of the pressing portions that are pressed by the pistons.

In the disc brake device, each of the pair of brake pads may have at least one slit in the corresponding friction material, and a groove depth of each slit of one of the pair of brake pads, having a larger number of slits not passing through any one of the pressing portions, may be larger than a groove depth of each slit of the other one of the pair of brake pads, having a smaller number of slits not passing through any one of the pressing portions.

In the disc brake device, a mass of one of the pair of brake pads, having a larger number of slits not passing through any one of the pressing portions, may be larger than a mass of one of the pair of brake pads, having a smaller number of slits not passing through any one of the pressing portions.

In the disc brake device, each of the pair of brake pads may have a back plate to which the corresponding friction material is fixed, and the number of holes provided in the back plate of one of the pair of brake pads and provided outside any one of pressing portions that are pressed by the pistons may be different from the number of holes provided in the back plate of the other one of the pair of brake pads and provided outside any one of the pressing portions that are pressed by the pistons.

In the disc brake device, each pressing portion may be a region to which a corresponding one of the pistons is projected in the axial direction.

A second aspect of the invention provides a disc brake device. The disc brake device includes: a disc rotor configured to be rotatable around its rotation axis; a pair of brake pads provided opposite to each other on both sides of the disc rotor with respect to an axial direction along the rotation axis; and a pressing mechanism configured to be able to press the pair of brake pads against the disc rotor from both sides of the disc rotor with use of pistons provided opposite to each other on both sides of the disc rotor with respect to the axial direction. Each of the pair of brake pads has a back plate to which a friction material facing a corresponding one of friction faces of the disc rotor is fixed, and the number of holes provided in the back plate of one of the pair of brake pads and provided outside any one of pressing portions that are pressed by the pistons is different from the number of holes provided in the back plate of the other one of the pair of brake pads and provided outside any one of the pressing portions that are pressed by the pistons.

A third aspect of the invention provides a pair of brake pads. The pair of brake pads are provided opposite to each other on both sides of a disc rotor in an axial direction along a rotation axis of the disc rotor, and are pressed against the disc rotor from both sides of the disc rotor with use of pistons provided so as to face each other on both sides of the disc rotor in the axial direction. The pair of brake pads include friction materials, respectively, each friction material facing a corresponding one of friction faces of the disc rotor. The number of slits provided in the friction material of one of the pair of brake pads and not passing through any one of pressing portions that are pressed by the pistons is different from the number of slits provided in the friction material of the other one of the brake pads and not passing through any one of the pressing portions that are pressed by the pistons.

A fourth aspect of the invention provides a pair of brake pads. The pair of brake pads are provided opposite to each other on both sides of a disc rotor in an axial direction along a rotation axis of the disc rotor, and are pressed against the disc rotor from both sides of the disc rotor with use of pistons provided so as to face each other on both sides of the disc rotor in the axial direction. The pair of brake pads include back plates, respectively, to each of which a friction material facing a corresponding one of friction faces of the disc rotor is fixed. The number of holes provided in the back plate of one of the pair of brake pads and provided outside any one of pressing portions that are pressed by the pistons is different from the number of holes provided in the back plate of the other one of the pair of brake pads and provided outside any one of the pressing portions that are pressed by the pistons.

With the disc brake devices and the pairs of brake pads according to the aspects of the invention, the number of slits provided in one of the pair of brake pads and not passing through any one of the pressing portions is different from the number of slits provided in the other one of the pair of brake pads and not passing through any one of the pressing portions, so it is possible to vary the easiness of vibrations between the pair of brake pads. As a result, the disc brake devices and the pairs of brake pads are able to suppress vibrations of the pair of brake pads due to symmetrical motions, so it is advantageously possible to suppress noise during braking.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described in detail with reference to the accompanying drawings. The embodiments do not limit the invention. Components in the following embodiments include components that are easily replaceable by persons skilled in the art and substantially the same components.

First Embodiment

Figure 1:
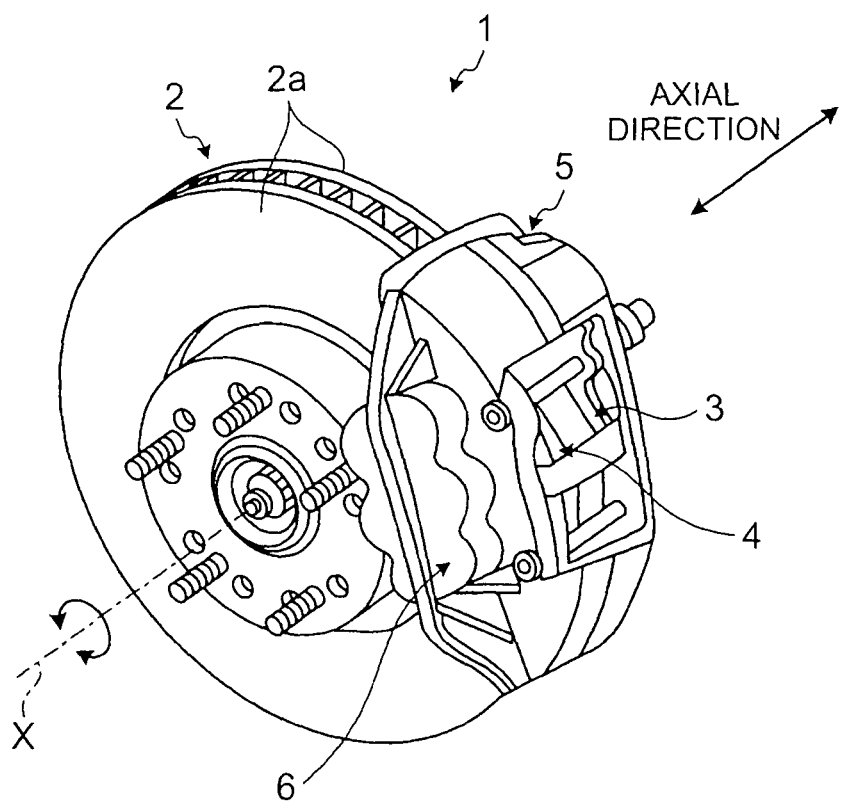
FIG. 1 is a perspective view that shows the schematic configuration of a disc brake device according to a first embodiment of the invention.
Figure 2:
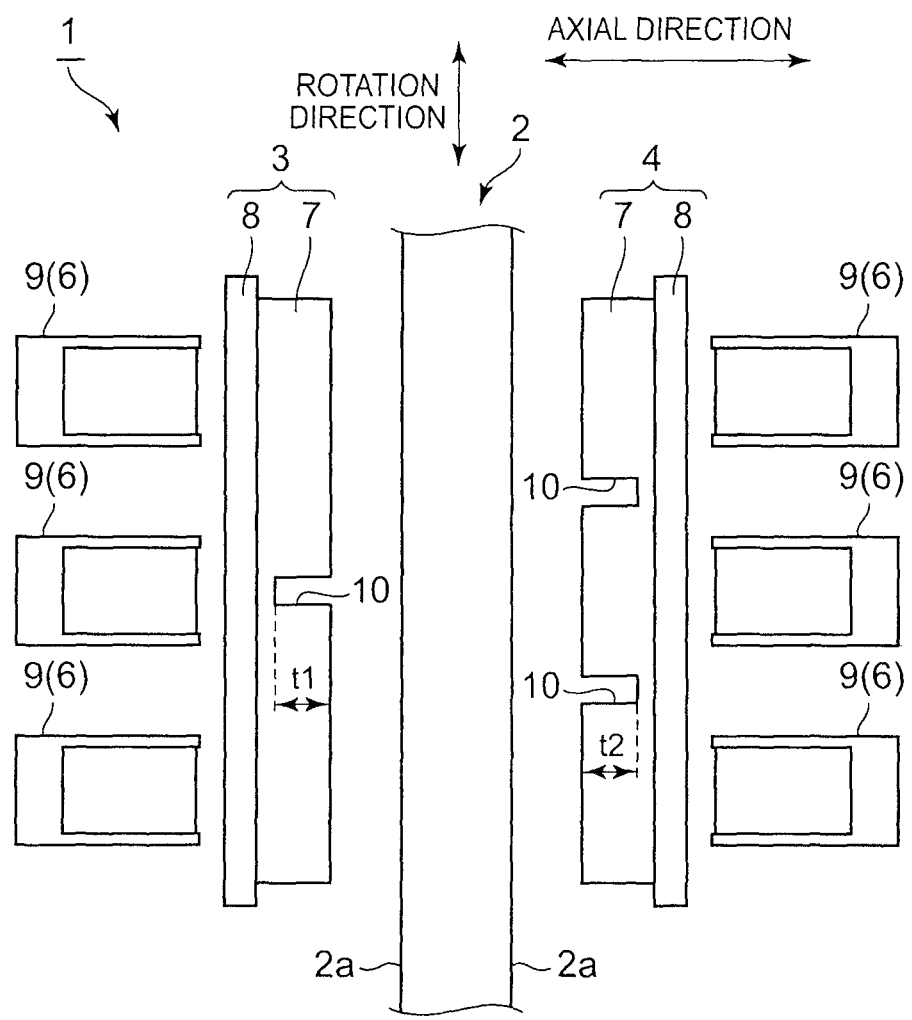
FIG. 2 is a schematic cross-sectional view that shows the schematic configuration of the disc brake device according to the first embodiment.
Figure 3:
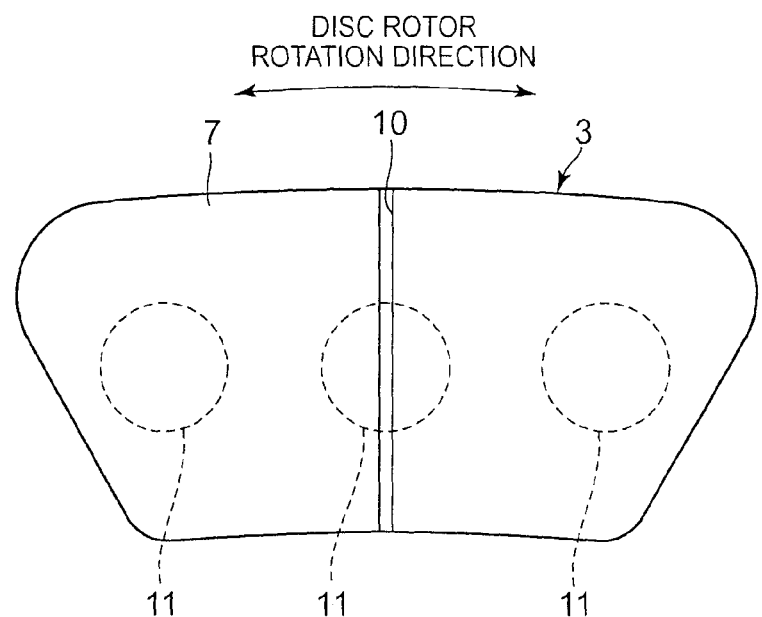
FIG. 3 is a front view of one of brake pads of the disc brake device according to the first embodiment.
Figure 4:
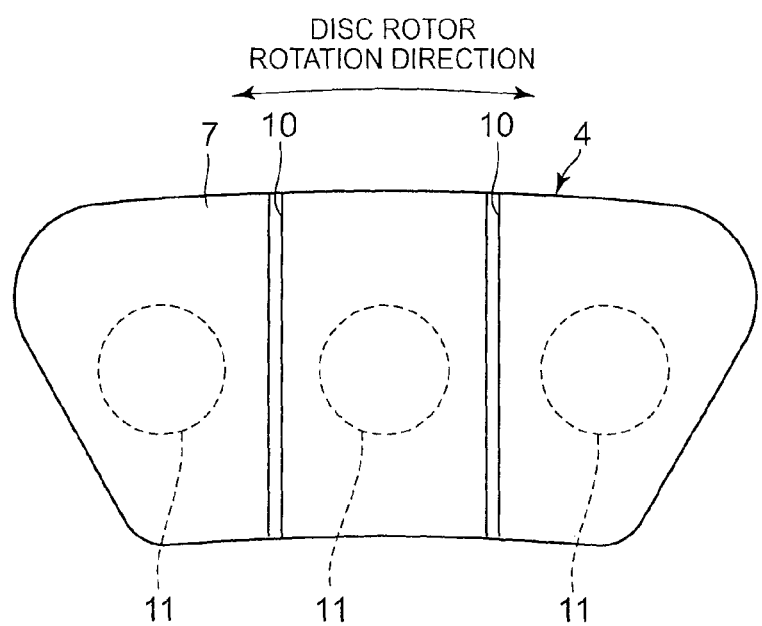
FIG. 4 is a front view of the other one of the brake pads of the disc brake device according to the first embodiment.
Figure 5:
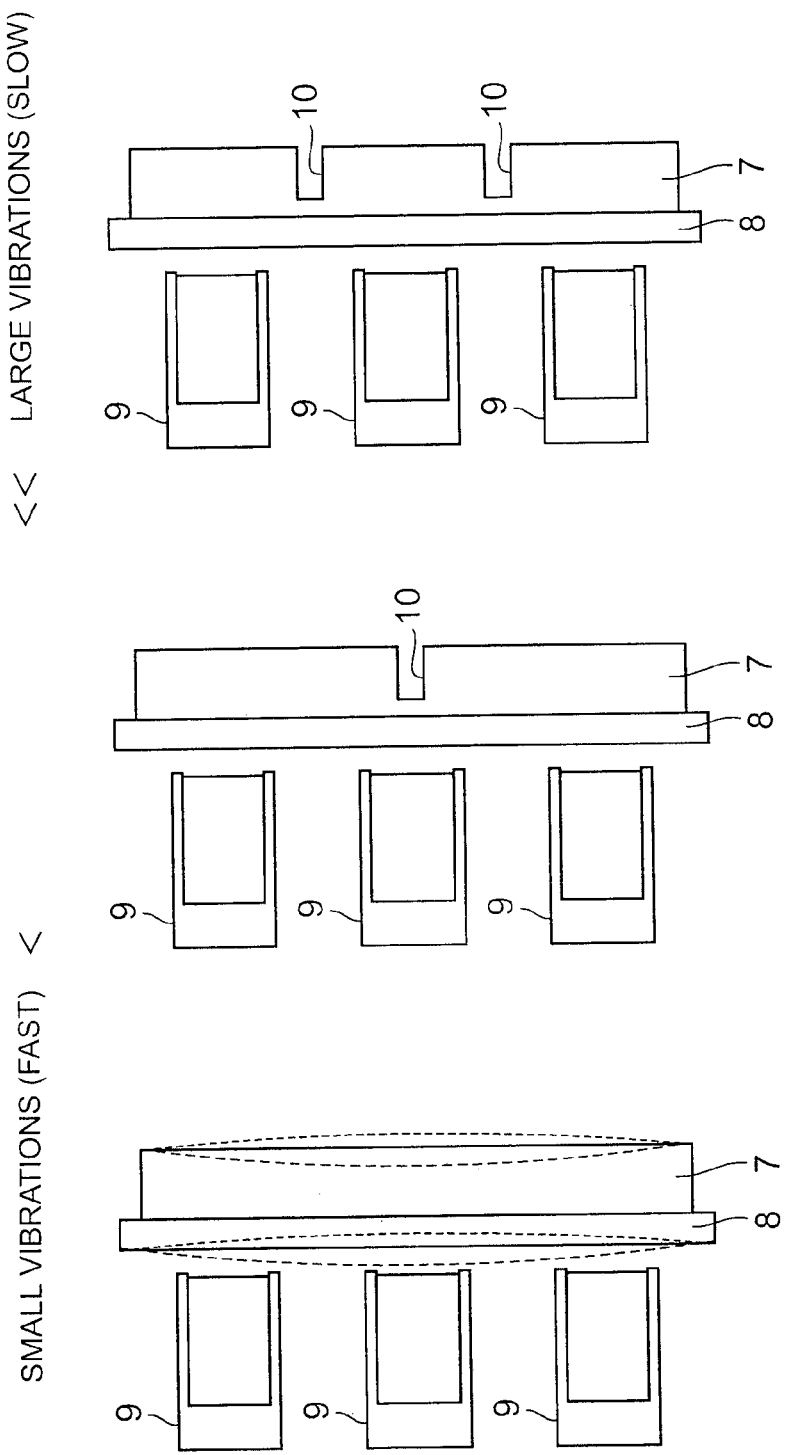
FIG. 5 is a schematic view that shows the motion of the disc brake device according to the first embodiment.
Figure 6:
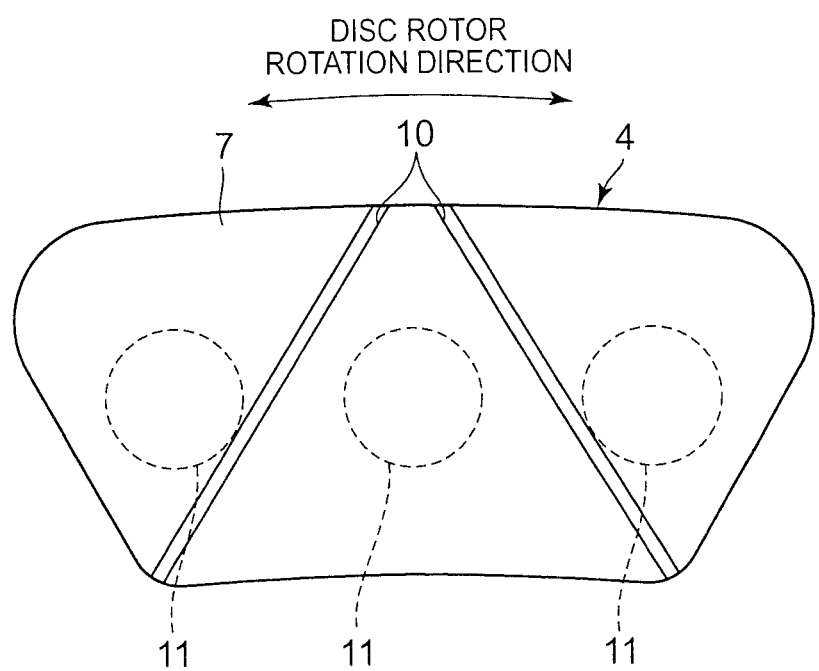
FIG. 6 is a front view of one of the brake pads of the disc brake device according to an alternative embodiment of the invention.

FIG. 1 is a perspective view that shows the schematic configuration of a disc brake device according to a first embodiment. FIG. 2 is a schematic cross-sectional view that shows the schematic configuration of the disc brake device according to the first embodiment. FIG. 3 and FIG. 4 are respectively front views of brake pads of the disc brake device according to the first embodiment. FIG. 5 is a schematic view that shows the motion of the disc brake device according to the first embodiment. FIG. 6 is a front view of one of the brake pads of the disc brake device according to an alternative. embodiment.

The disc brake device 1 according to the present embodiment, shown in FIG. 1, is mounted on a vehicle, and applies braking force to a wheel rotatably supported by a body of the vehicle. The disc brake device 1 is a so-called piston-opposed caliper-type disc brake device in which a plurality of pistons 9 (see FIG. 2) are arranged on both sides of a disc rotor 2 and both sides of the disc rotor 2 are sandwiched by the plurality of pistons 9 via brake pads 3, 4. The piston-opposed caliper-type disc brake device 1 generates braking force by pressing the pair of brake pads 3, 4 with the use of the pistons 9 of a pressing mechanism 6. The pair of brake pads 3, 4 are provided opposite to each other on both sides of the disc rotor 2.

Specifically, the disc brake device 1 includes the disc rotor 2, the pair of brake pads 3, 4 and a caliper 5. The caliper 5 includes the pressing mechanism 6, and the like.

The disc rotor 2 is formed in substantially a disc shape. The disc rotor 2 is coupled to an axle of the vehicle. The disc rotor 2 is provided on the wheel side so as to be rotatable around a rotation axis X of the axle integrally with the wheel. The disc rotor 2 has two disc-shaped faces perpendicular to the rotation axis X. These disc-shaped faces constitute friction faces 2a.

The pair of brake pads 3, 4 are friction members provided in pairs so as to face the corresponding friction faces 2a on both sides of the disc rotor 2. The pair of brake pads 3, 4 are provided so as to opposite to each other on both sides of the disc rotor 2 in an axial direction along the rotation axis X. As shown in FIG. 2, the pair of brake pads 3, 4 each have a friction material 7 and a back plate (back metal) 8. Each friction material 7 faces a corresponding one of the friction faces 2a of the disc rotor 2. Each back plate 8 is a plate-shaped support member on which pressing force acts from the pressing mechanism 6, and the corresponding friction material 7 is fixed to each back plate 8. Each of the brake pads 3, 4 is formed such that one face (proximal end face) of the friction material 7 is fixed to the back plate 8. Each of the pair of brake pads 3, 4 is arranged such that the friction material 7 is located on the disc rotor 2 side in the axial direction and the back plate 8 is located on the back face side (side across from the disc rotor 2 side) of the friction material 7 in the axial direction. The pair of brake pads 3, 4 have substantially similar shapes, dimensions and positions other than slits 10 (described later). That is, the pair of brake pads 3, 4 are formed substantially symmetrical with respect to the disc rotor 2 in the axial direction except the slits 10 (described later). The details of the slits 10 of these brake pads 3, 4 will be described later.

Referring back to FIG. 1, the caliper 5 holds the pair of brake pads 3, 4 such that the pair of brake pads 3, 4 are able to approach to or move away from the corresponding friction faces 2a of the disc rotor 2. The caliper 5 is arranged so as to sandwich part of both friction faces 2a of the disc rotor 2. The caliper 5 is fixed to a body-side frame, or the like, via an intermediate beam, or the like, so as not to rotate around the rotation axis X. The caliper 5 holds the brake pad 3 on the vehicle body side to the disc rotor 2, and holds the brake pad 4 on the other side. That is, in the pair of brake pads 3, 4, the brake pad 3 serves as an inner pad, and the brake pad 4 serves as an outer pad. The caliper 5 includes the pressing mechanism 6.

The pressing mechanism 6 is able to press the pair of brake pads 3, 4 against the disc rotor 2 from both sides of the disc rotor 2. As shown in FIG. 2, the pressing mechanism 6 includes the plurality of pistons 9 provided on both sides of the disc rotor 2 so as to be opposite to each other in the axial direction. The pressing mechanism 6 is able to press the pair of brake pads 3, 4 against the disc rotor 2 from both sides of the disc rotor 2 with the use of the pistons 9. The caliper 5 is of, for example, a so-called piston-opposed six-pot type in which the pressing mechanism 6 illustrated in FIG. 2 is configured such that the pistons 9 are arranged three by three on both sides of the disc rotor 2; however, the caliper 5 is not limited to this configuration. For example, the caliper 5 may be of a piston-opposed two-pot type or a piston-opposed four-pot type.

The plurality of pistons 9 according to the present embodiment include the first pistons 9 and the second pistons 9. The first pistons 9 are able to press-the brake pad 3 against the disc rotor 2. The second pistons 9 are able to press the brake pad 4 against the disc rotor 2. Here, the first pistons 9 and the second pistons 9 both are provided three by three. The first pistons 9 are provided on the back face side (side across from the friction material 7 side) of the back plate 8 of the brake pad 3. The three first pistons 9 are provided at equal intervals along the rotation direction of the disc rotor 2. The second pistons 9 are provided on the back face side (side across from the friction material 7 side) of the back plate 8 of the brake pad 4. The three second pistons 9 are provided at equal intervals along the rotation direction of the disc rotor 2. The three first pistons 9 and the three second pistons 9 are provided so as to opposite to each other via the disc rotor 2 in the axial direction. The three first pistons 9 and the three second pistons 9 have substantially similar shapes, dimensions and positions. That is, the three first pistons 9 and the three second pistons 9 are formed substantially symmetrical with respect to the disc rotor 2 in the axial direction.

The pistons 9 are respectively accommodated in cylinder chambers' formed on the inner face side of the caliper 5, and are supported so as to be able to approach to or move away from the brake pads 3, 4 in the axial direction. The pressing mechanism 6 causes the pistons 9 to contact the back plates 8 of the brake pads 3, 4 when working medium, such as working fluid, is supplied to a fluid pressure chamber (so-called wheel cylinder) defined between each piston 9 and the inner wall face of a corresponding one of the cylinders, and generates pressing force for pressing the friction materials 7 against the corresponding friction faces 2a of the disc rotor 2.

In the thus configured disc brake device 1, for example, working fluid is supplied to the fluid pressure chambers of the pressing mechanism 6 and pressurized in response to driver's depressing operation of a brake pedal, brake control, such as so-called ABS control, or the like. In the disc brake device 1, the pistons 9 respectively advance toward the corresponding back plates 8 of the brake pads 3, 4, and the front faces of the pistons 9 press the back plates 8 of the brake pads 3, 4. Thus, the disc brake device 1 is able to cause the friction materials 7 of the brake pads 3, 4 to approach and press the friction materials 7 against the friction faces 2a of the disc rotor 2. In the disc brake device 1, the brake pads 3, 4 are pressed against the friction faces 2a of the disc rotor 2 to sandwich the disc rotor 2 by pressing force that is generated when working fluid is supplied into the fluid pressure chambers of the pressing mechanism 6. Thus, in the disc brake device 1, friction resistance force is generated between the brake pads 3, 4 and the disc rotor 2 that rotates together with the wheel, and predetermined rotational resistance force acts on the disc rotor 2. As a result, the disc brake device 1 is able to apply braking force to the disc rotor 2 and the wheel that integrally rotates with the disc rotor 2. In the disc brake device 1, when the fluid pressure chambers of the pressing mechanism 6 are decompressed, the pistons 9 are retracted and returned to predetermined positions, and the friction materials 7 of the brake pads 3, 4 move away from the friction faces 2a of the disc rotor 2.

As shown in FIG. 2, the disc brake device 1 according to the present embodiment suppresses noise, such as so-called brake squeal, during braking by optimally setting a positional relationship between the positions of the slits 10 provided in the pair of brake pads 3, 4 and pressing portions 11 (see FIG. 3 and FIG. 4) of the pistons 9.

As shown in FIG. 2, FIG. 3 and FIG. 4, in the disc brake device 1 according to the present embodiment, the slits 10 are respectively provided in both the friction materials 7 of the brake pads 3, 4 in the opposed six-pot caliper 5. Here, the single slit 10 is provided in the friction material 7 of the brake pad 3, and the two slits 10 are provided in the friction material 7 of the brake pad 4.

Each slit 10 is formed in the corresponding friction material 7 so as to extend through from one side to the other side along the rotation direction of the disc rotor 2. In other words, each slit 10 is formed along substantially the radial direction of the disc rotor 2. Here, the two slits 10 formed in the brake pad 4 are formed so as to be substantially parallel to each other. Similarly, the slit 10 formed in the brake pad 3 and the slits 10 formed in the brake pad 4 are formed so as to substantially parallel to each other.

Here, each slit 10 does not extend through the corresponding friction material 7 in the thickness direction of the friction material 7, and is formed as a closed-end groove. The slits 10 according to the present embodiment are formed such that the groove depth t1 of the slit 10 of the brake pad 3 in the thickness direction and the groove depth t2 of each slit 10 of the brake pad 4 in the thickness direction are substantially equivalent to each other.

The pair of brake pads 3, 4 are configured such that the number of the slits 10 riot passing through any one of the pressing portions 11 that are pressed by the pistons 9 is varied therebetween. Here, the pressing portions 11 that are pressed by the pistons 9 are portions at which the pistons 9 press the brake pads 3, 4, and correspond to projected regions of the pistons 9 in the axial direction.

As shown in FIG. 2 and FIG. 3, in the brake pad 3 according to the present embodiment, the single slit 10 is formed in the corresponding friction material 7 so as to pass through the center pressing portion 11. On the other hand, as shown in FIG. 2 and FIG. 4, in the brake pad 4, the two slits 10 are formed in the friction material 7 so as not to pass through any one of the pressing portions 11. That is, according to the present embodiment, the number of the slits 10 passing through any one of the pressing portions 11 is one and the number of the slits 10 not passing through any one of the pressing portions 11 is 0 in the brake pad 3, whereas the number of the slits 10 passing through any one of the pressing portions 11 is 0 and the number of the slits 10 not passing through any one of the pressing portions 11 is two in the brake pad 4. In other words, the disc brake device 1 according to the present embodiment is configured such that the brake pad 4 that serves as the outer pad has a larger number of the slits 10 not passing through any one of the pressing portions 11.

The thus configured disc brake device 1 is able to vary the easiness of vibrations between the pair of brake pads 3, 4 during braking because the number of the slits 10 of one of the pair of brake pads 3, 4, not passing through any one of the pressing portions 11, is different from the number of the slits 10 of the other one of the pair of brake pads 3, 4, not passing through any one of the pressing portions 11. That is, as shown in FIG. 5, because the brake pad 4 has a relatively larger number of the slits 10 not passing through any one of the pressing portions 11, the number of the slits 10 not pressed by the pistons 9 during braking becomes relatively large, so bending stiffness during braking becomes relatively low. Therefore, the brake pad 4 relatively easily carries out bending vibrations (large vibrations) during braking, the period of bending vibrations becomes relatively long, in other words, there is a tendency that the vibration speed is slow and the frequency is low. On the other hand, because the brake pad 3 has a relatively smaller number of the slits 10 not passing through any one of the pressing portions 11, bending vibrations are relatively hard to occur (small vibrations) during braking, and the period of bending vibrations becomes relatively short, in other words, there is a tendency that the vibration speed is fast and the frequency is high. Here, FIG. 5 also shows an example in which no slit 10 is provided. For example, the brake pad 3 having no slit 10 tends to be more hard to carry out bending vibrations. However, for example, when the slit 10 is provided in the brake pad 3 for crack prevention, or the like, the surroundings of the slit 10 is able to be pressed by the pistons 9 during braking by allowing the slit 10 to pass through any one of the pressing portion 11 as in the case of the present embodiment, so it is possible to keep relatively high bending stiffness during braking. Thus, the brake pad 3 is allowed to be sufficiently hard to carry out bending vibrations during braking as compared to the brake pad 4. As the difference in the number of the slits 10 not passing through any one of the pressing portions 11 between the pair of brake pads 3, 4 relatively increases, it is possible to further significantly vary the easiness of vibrations therebetween.

As a result, the disc brake device 1 is able to suppress vibrations of the pair of brake pads 3, 4 due to symmetrical motions during braking by varying the easiness of vibrations between the pair of brake pads 3, 4 as described above. Particularly, the disc brake device 1 is of a piston-opposed caliper type in which the pair of brake pads 3, 4, and the like, are formed in substantially a symmetrical shape with respect to the disc rotor 2 except the slits 10 as described above, and the pair of brake pads 3, 4 tend to vibrate because of symmetrical motions. However, the disc brake device 1 according to the present embodiment is able to cause the pair of brake pads 3, 4 to vibrate in asymmetrical motions wherever possible by properly setting the positional relationship between the positions of the slits 10 and the pressing portions 11 as described above. The disc brake device 1 is able to suppress vibrations, of the pair of brake pads 3, 4 due to symmetrical motions even with the configuration of the piston-opposed caliper type, so it is possible to, for example, suppress a resonance phenomenon. Thus, the disc brake device 1 is able to suppress noise during braking, such as brake squeal.

The above-described disc brake device 1 according to the embodiment includes the disc rotor 2, the pair of brake pads 3, 4 and the pressing mechanism 6. The disc rotor 2 is rotatable around the rotation axis X. The pair of brake pads 3, 4 are provided opposite to each other on both sides of the disc rotor 2 in the axial direction along the rotation axis X. The pressing mechanism 6 is able to press the pair of brake pads 3, 4 against the disc rotor 2 from both sides of the disc rotor 2 with the use of the pistons 9 provided opposite to each other on both sides of the disc rotor 2 in the axial direction. The pair of brake pads 3, 4 each have the friction material 7 that faces a corresponding one of the friction faces 2a of the disc rotor 2, and have mutually different number of the slits 10 provided in the corresponding friction materials 7 and not passing through any one of the pressing portions 11 that are pressed by the pistons 9. Thus, the disc brake device 1 and the pair of brake pads 3, 4 are able to vary the easiness of vibrations between the pair of brake pads 3, 4, and are able to suppress vibrations of the pair of brake pads 3, 4 due to symmetrical motions during braking, so it is possible to suppress noise during braking.

In the above description, the single slit 10 formed in the brake pad 3 and the two slits 10 formed in the brake pad 4 are formed so as to be substantially parallel to each other; however, these slits 10 are not limited to this configuration. That is, each slit 10 is formed in substantially the radial direction of the disc rotor 2; however, each slit 10 is not limited to this configuration. For example, as shown in an alternative embodiment shown in FIG. 6, the two slits 10 formed in the brake pad 4 just need to be formed so as not to pass through any one of the pressing portions 11 and may be formed so as not to be parallel to each other. In the alternative embodiment shown in FIG. 6, the two slits 10 formed in the brake pad 4 are respectively formed to be inclined with respect to each other so as to extend through from substantially the center portion of one side formed along the rotation direction of the disc rotor 2 to both ends of the other side in the friction material 7. In the above description, each slit 10 does not extend through the friction material 7 in the thickness direction; however, each slit 10 is not limited to this configuration. Each slit 10 may extend through the friction material 7 in the thickness direction.

Second Embodiment

Figure 7:
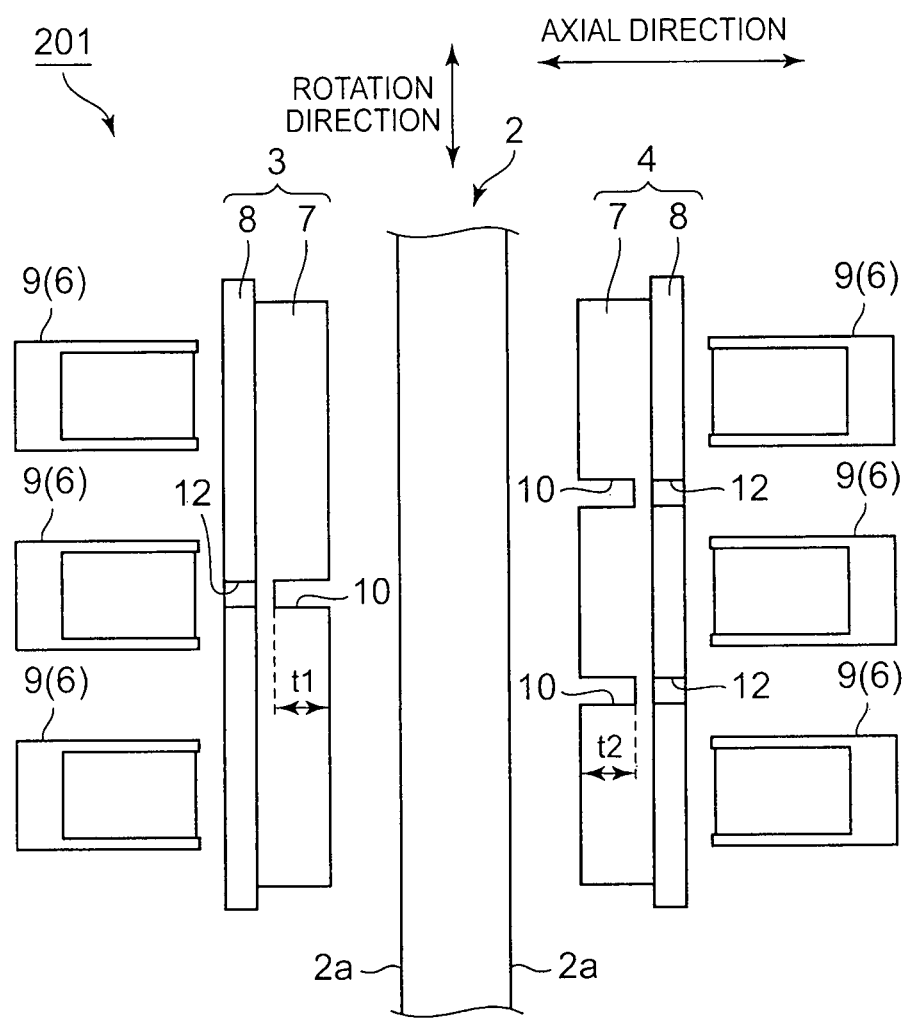
FIG. 7 is a schematic cross-sectional view that shows the schematic configuration of a disc brake device according to a second embodiment of the invention.

FIG. 7 is a schematic cross-sectional view of a disc brake device according to a second embodiment. The disc brake device and a pair of brake pads according to the second embodiment differ from those of the first embodiment in the positional relationship of holes provided in back plates. For other configuration, operation and advantageous effects common to the above-described embodiment, the overlap description is omitted as much as possible. FIG. 1, and the like, are referenced as needed for the components of the disc brake device (the same applies to the embodiments described below).

The disc brake device 201 according to the present embodiment, shown in FIG. 7, attempts to further suppress noise by optimally setting the positional relationship between the positions of the holes 12 provided in the pair of brake pads 3, 4 and the pressing portions 11 (see FIG. 3 and FIG. 4).

In the pair of brake pads 3, 4, for example, the plurality of holes 12, such as mold holes, are formed in the back plates 8, for example, in process of manufacturing the back plates 8. Here, the single hole 12 is provided in the back plate of the brake pad 3, and the two holes 12 are provided in the back plate 8 of the brake pad 4. Each hole 12 is, for example, formed in a circular columnar shape, and extends through the corresponding back plate 8 in the axial direction.

The pair of brake pads 3, 4 according to the present embodiment are configured such that the number of the holes 12 provided outside the pressing portions 11 (see FIG. 3 and FIG. 4) is varied between the pair of brake pads 3, 4.

In the brake pad 3 according to the present embodiment, the single hole 12 is formed within the center pressing portion 11 in the back plate 8. On the other hand, in the brake pad 4, the two holes 12 are formed outside the pressing portions 11 in the back plate 8. That is, as in the case of the number of the slits 10 not passing through any one of the pressing portions 11, the number of the holes 12 provided outside the pressing portion 11 is 0 in the brake pad 3 according to the present embodiment, whereas the number of the holes 12 provided outside the pressing portions 11 is two in the brake pad 4. In other words, the disc brake device 201 according to the present embodiment is configured such that the brake pad 4 that serves as the outer pad has a larger number of the holes 12 provided outside the pressing portions 11. Here, each hole 12 is formed at a location of the corresponding back plate 8, facing the slit 10.

The thus configured disc brake device 201 is able to further remarkably vary the easiness of vibrations between the pair of brake pads 3, 4 during braking because the number of the holes 12 provided outside the pressing portions 11 in one of the pair of brake pads 3, 4 is different from the number of the holes 12 provided outside the pressing portions 11 in the other one of the pair of brake pads 3, 4, in addition to the number of the slits 10 not passing through any one of the pressing portions 11. That is, because the brake pad 4 has a relatively larger number of the slits 10 not passing through any one of the pressing portions 11 and a relatively larger number of the holes 12 provided outside the pressing portions 11, the number of the holes 12 also becomes relatively large in addition to the number of the slits 10 that are not pressed by the pistons 9 during braking, so bending stiffness during braking becomes further low. Therefore, the brake pad 4 further easily carries out bending vibrations (large vibrations) during braking, and is allowed to have a further low frequency. On the other hand, because the brake pad 3 has a relatively small number of the slits 10 not passing through any one of the pressing portion 11 and a relatively small number of the holes 12 provided outside the pressing portions 11, the surroundings of the slits 10 and the surroundings of the holes 12 are allowed to be pressed by the pistons 9 during braking, so the brake pad 3 is able to keep relatively high bending stiffness. Thus, as compared to the brake pad 4, the brake pad 3 is able to further remarkably make bending vibrations hard to occur (small vibrations) during braking, and is allowed to have a further high frequency.

Thus, the disc brake device 201 and the pair of brake pads 3, 4 are able to further remarkably vary the easiness of vibrations between the pair of brake pads 3, 4 during braking, and are able to further reliably suppress vibrations of the pair of brake pads 3, 4 due to symmetrical motions, so it is possible to further reliably suppress noise during braking.

Third Embodiment

Figure 8:
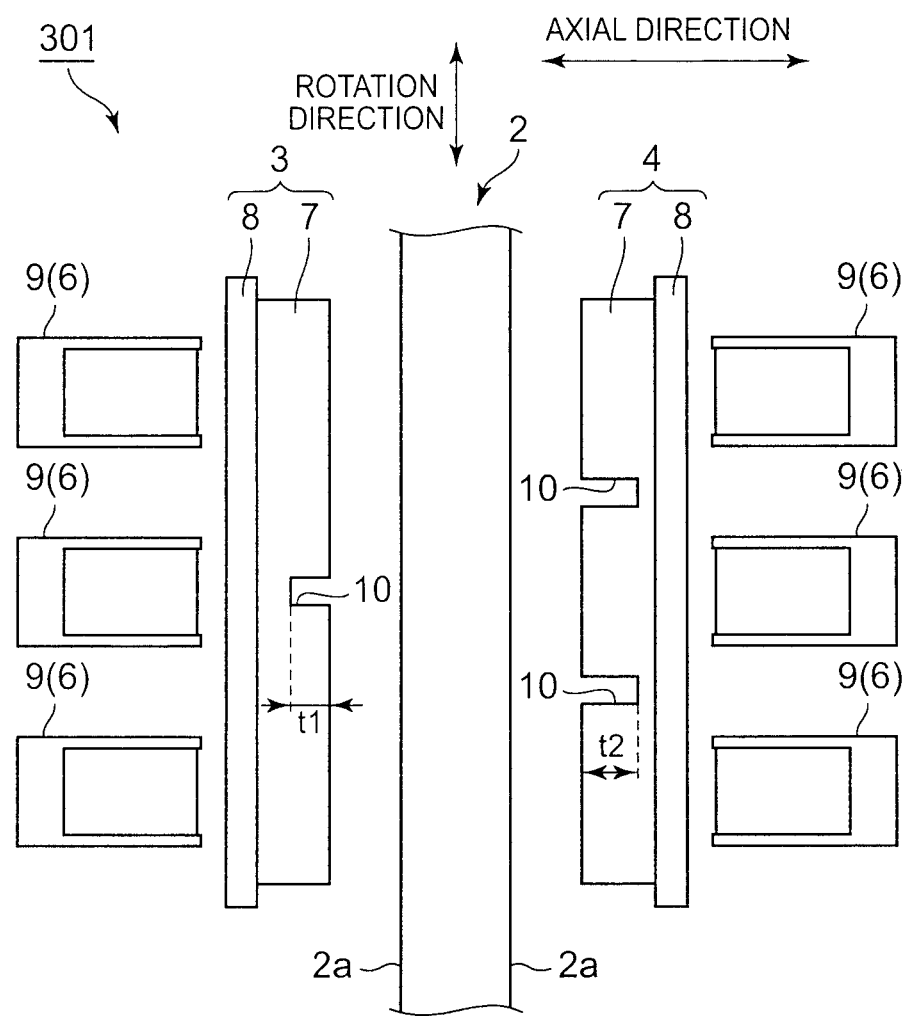
FIG. 8 is a schematic cross-sectional view that shows the schematic configuration of a disc brake device according to a third embodiment of the invention.

FIG. 8 is a schematic cross-sectional view that shows the schematic configuration of a disc brake device according to a third embodiment. The disc brake device and a pair of brake pads according to the third embodiment differ from those of the first or second embodiment in the groove depth of each slit.

In the disc brake device 301 according to the present embodiment, shown in FIG. 8, the groove depth of each of the slits 10 provided in one of the pair of brake pads 3, 4 is different from the groove depth of each of the slits provided in the other one of the pair of brake pads 3, 4. In the pair of brake pads 3, 4, each friction material 7 has at least one slit. Here, as described above, the brake pad 3 has the single slit 10 passing through any one of the pressing portions 11 (see FIG. 3 and FIG. 4) in the friction material 7, and the brake pad 4 has the two slits 10 not passing through any one of the pressing portions 11 in the friction material 7.

The pair of brake pads 3, 4 according to the present embodiment are configured such that the groove depth t2 of each slit 10 of one of the pair of brake pads 3, 4, having a larger number of the slits 10 not passing through any one of the pressing portions 11, here, the brake pad 4, is larger than the groove depth t1 of each slit 10 of the other one of the pair of brake pads 3, 4, having a smaller number of the slits 10 not passing through any one of the pressing portions 11, here, the brake pad 3.

In the thus configured disc brake device 301, the groove depth t2 of the brake pad 4 having a larger number of the slits 10 not passing through any one of the pressing portions 11 is set to be relatively large, and the groove depth t1 of the brake pad 3 having a smaller number of the slits 10 not passing through any one of the pressing portions 11 is set to be relatively small. Thus, the disc brake device 301 is able to further remarkably vary the easiness of vibrations, between the pair of brake pads 3, 4 during braking. That is, because the brake pad 4 has a relatively large groove depth t2 in addition to a relatively larger number of the slits 10 not passing through any one of the pressing portions 11, bending stiffness during braking further decreases. Therefore, the brake pad 4 further easily carries out bending vibrations (large vibrations) during braking, and is allowed to have a further low frequency. On the other hand, because the brake pad 3 has a relatively small groove depth t1 in addition to a relatively smaller number of the slits 10 not passing through any one of the pressing portions 11, the brake pad 3 is able to keep relatively high bending stiffness during braking. Thus, as compared to the brake pad 4, the brake pad 3 is able to further remarkably make bending vibrations hard to occur (small vibrations) during braking, and is allowed to have a further high frequency.

Thus, the disc brake device 301 and the pair of brake pads 3, 4 are able to further remarkably vary the easiness of vibrations between the pair of brake pads 3, 4 during braking, and are able to further reliably suppress vibrations of the pair of brake pads 3, 4 due to symmetrical motions, so it is possible to further reliably suppress noise during braking.

Fourth Embodiment

Figure 9:
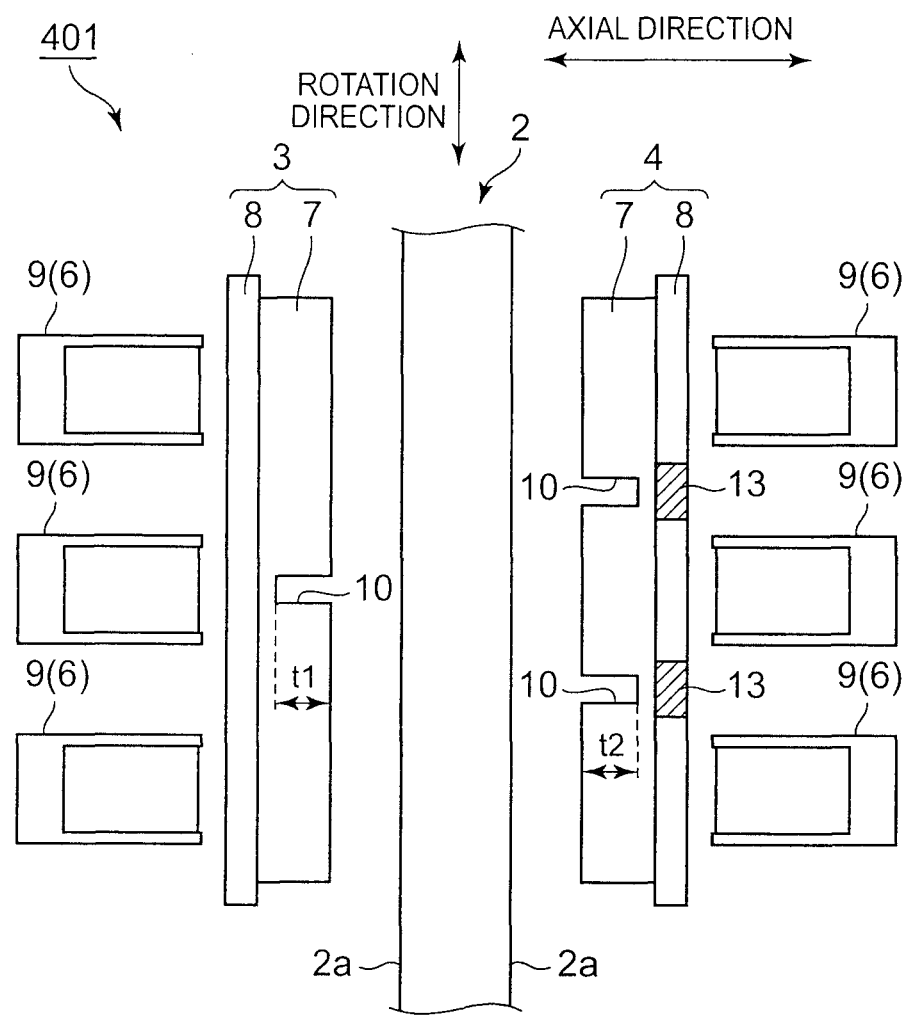
FIG. 9 is a schematic cross-sectional view that shows the schematic configuration of a disc brake device according to a fourth embodiment of the invention.

FIG. 9 is a schematic cross-sectional view that shows the schematic configuration of a disc brake device according to a fourth embodiment. The disc brake device and a pair of brake pads according to the fourth embodiment differ from those of the first, second or third embodiment in that one of the brake pads has mass members.

In the disc brake device 401 according to the present embodiment, shown in FIG. 9, one of the pair of brake pads 3, 4 has the mass members 13.

According to the present embodiment, one of the pair of brake pad 3, 4, having a larger number of the slits 10 not passing through any one of the pressing portions 11 (see FIG. 3 and FIG. 4), here, the brake pad 4, has the mass members 13. Here, the plurality of mass members 13 are assembled to the back plate 8 of the brake pad 4. Thus, in the pair of brake pads 3, 4, the mass of the brake pad 4 becomes relatively larger than the mass of the brake pad 3. That is, in the pair of brake pads 3, 4, the mass of the brake pad 4 having a larger number of the slits 10 not passing through any one of the pressing portions 11 is larger than the mass of the brake pad 3 having a smaller number of the slits 10 not passing through any one of the pressing portions 11.

The thus configured disc brake device 401 is able to further remarkably vary the easiness of vibrations between the pair of brake pads 3, 4 during braking by adding the mass members 13 to the brake pad 4 having a larger number of the slits 10 not passing through any one of the pressing portions 11. That is, the brake pad 4 is increased in mass by the mass members 13 as compared to the brake pad 3 in addition to a relatively larger number of the slits 10 not passing through any one of the pressing portions 11. Therefore, the brake pad 4 is able to further extend the period of bending vibrations as compared to the brake pad 3, in other words, the brake pad 4 is able to further decrease the vibration speed and further decrease the frequency.

Thus, the disc brake device 401 and the pair of brake pads 3, 4 are able to further remarkably vary the easiness of vibrations between the pair of brake pads 3, 4 during braking, and are able to further reliably suppress vibrations of the pair of brake pads 3, 4 due to symmetrical motions, so it is possible to further reliably suppress noise during braking.

Fifth Embodiment

Figure 10:
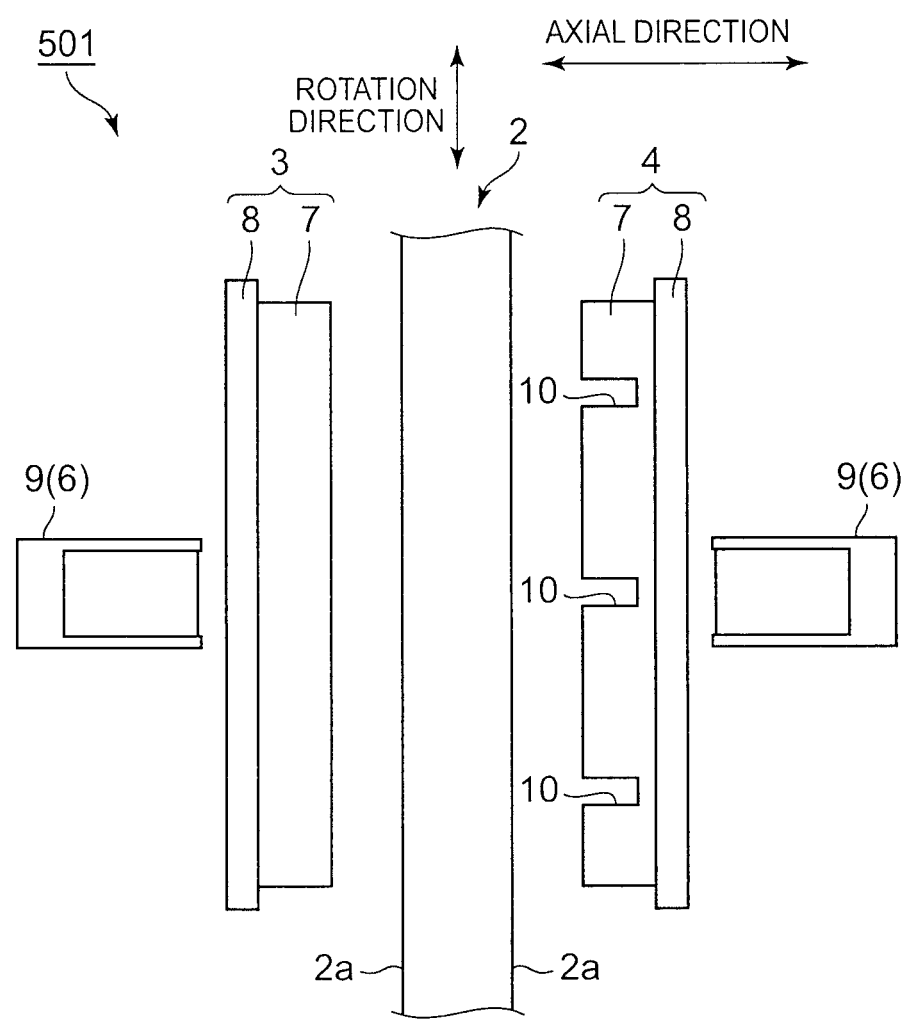
FIG. 10 is a schematic cross-sectional view that shows the schematic configuration of a disc brake device according to a fifth embodiment of the invention.

FIG. 10 is a schematic cross-sectional view that shows the schematic configuration of a disc brake device according to a fifth embodiment. The disc brake device and a pair of brake pads according to the fifth embodiment differ from those of the first, second, third or fourth embodiment in the number of the pistons and the number of the slits.

The disc brake device 501 according to the present embodiment, shown in FIG. 10, includes a piston-opposed two-pot-type caliper 5 in which the piston 9 is arranged one by one on each side of the disc rotor 2. In the disc brake device 501, no slit 10 is provided in the friction material 7 of the brake pad 3, and the three slits 10 are provided in the friction material 7 of the brake pad 4.

In the brake pad 4 according to the present embodiment, the single slit 10 is formed in the friction material 7 so as to pass through the center pressing portion (not shown), and the remaining two slits 10 are formed in the friction material 7 so as not to. pass through any one of the pressing portions. That is, according to the present embodiment, the number of the slits 10 itself provided in the friction material 7 is 0 in the brake pad 3, whereas the number of the slits 10 passing through any one of the pressing portions is one and the number of the slits 10 not passing through any one of the pressing portions is two in the brake pad 4. In other words, the disc brake device 501 according to the present embodiment is configured such that the brake pad 4 that serves as the outer pad has a larger number of the slits 10 not passing through any one of the pressing portions.

The thus configured disc brake device 501 is able to vary the easiness of vibrations between the pair of brake pads 3, 4 during braking because the number of the slits 10 of one of the pair of brake pads 3, 4 not passing through any one of the pressing portions is different from the number of the slits 10 of the other one of the pair of brake pads 3, 4 not passing through any one of the pressing portions. That is, the brake pad 4 has a relatively larger number of the slits 10 not passing through any one of the pressing portions, so the brake pad 4 relatively easily carries out bending vibrations (large vibrations) during braking, the period of bending vibrations becomes relatively long, in other words, there is a tendency that the vibration speed is slow and the frequency is low. On the other hand, because the brake pad 3 has a relatively smaller number of the slits 10 not passing through any one of the pressing portions, bending vibrations are relatively hard to occur (small vibrations) during braking, and the period of bending vibrations becomes relatively short, in other words, there is a tendency that the vibration speed is fast and the frequency is high. As a result, the disc brake device 501 is able to suppress vibrations of the pair of brake pads 3, 4 due to symmetrical motions by varying the easiness of vibrations between the pair of brake pads 3, 4 as described above. Thus, the disc brake device 501 is able to suppress noise during braking, such as brake squeal.

Sixth Embodiment

Figure 11:
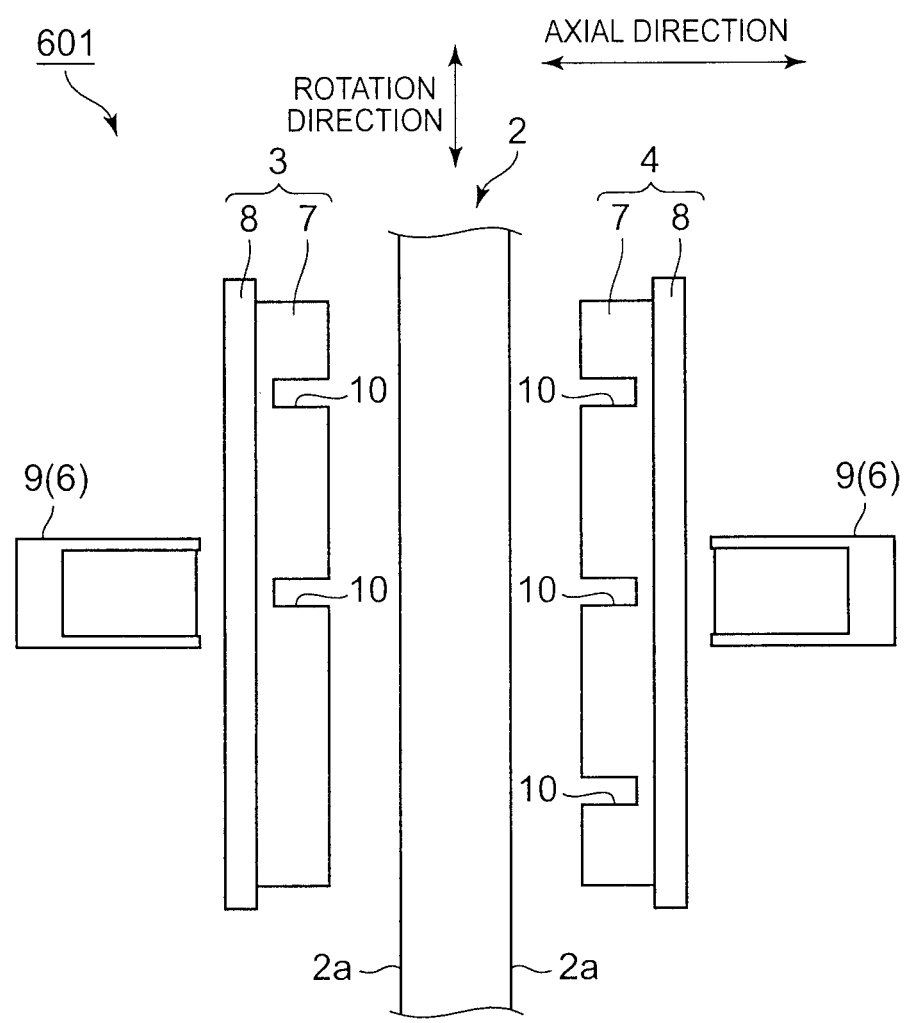
FIG. 11 is a schematic cross-sectional view that shows the schematic configuration of a disc brake device according to a sixth embodiment of the invention.

FIG. 11 is a schematic cross-sectional view that shows the schematic configuration of a disc brake device according to a sixth embodiment. The disc brake device and a pair of brake pads according to the sixth embodiment differ from those of the first, second, third, fourth or fifth embodiment in the number of the pistons and the number of the slits.

The disc brake device 601 according to the present embodiment, shown in FIG. 11, includes a piston-opposed two-pot-type caliper 5 in which the piston 9 is arranged one by one on each side of the disc rotor 2. In the disc brake device 601, the two slits 10 are provided in the friction material 7 of the brake pad 3, and the three slits 10 are provided in the friction material 7 of the brake pad 4.

According to the present embodiment, the single slit 10 is formed in the friction material 7 of the brake pad 3 so as to pass through the center pressing portion (not shown), and the remaining one slit 10 is formed in the friction material 7 so as not to pass through any one of the pressing portions. According to the present embodiment, the single slit 10 is formed in the friction material 7 of the brake pad 4 so as to pass through the center pressing portion, and the remaining two slits 10 are formed in the friction material 7 so as not to pass through any one of the pressing portions. That is, according to the present embodiment, the number of the slits 10 passing through any one of the pressing portions is one and the number of the slits 10 not passing through any one of the pressing portions is one in the brake pad 3, whereas the number of the slits 10 passing through any one of the pressing portions is one and the number of the slits 10 not passing through any one of the pressing portions is two in the brake pad 4. In other words, the disc brake device 601 according to the present embodiment is configured such that the brake pad 4 that serves as the outer pad has a larger number of the slits 10 not passing through any one of the pressing portions.

The thus configured disc brake device 601 is able to vary the easiness of vibrations between the pair of brake pads 3, 4 during braking because the number of the slits 10 provided in one of the pair of brake pads 3, 4 and not passing through any one of the pressing portions is different from the number of the slits 10 provided in the other one of the pair of brake pads 3, 4 and not passing through any one of the pressing portions. That is, the brake pad 4 has a relatively larger number of the slits 10 not passing through any one of the pressing portions, so the brake pad 4 relatively easily carries out bending vibrations (large vibrations) during braking, the period of bending vibrations becomes relatively long, in other words, there is a tendency that the vibration speed is slow and the frequency is low. On the other hand, because the brake pad 3 has a relatively smaller number of the slits 10 not passing through any one of the pressing portions, bending vibrations are relatively hard to occur (small vibrations) during braking, and the period of bending vibrations becomes relatively short, in other words, there is a tendency that the vibration speed is fast and the frequency is high. As a result, the disc brake device 601 is able to suppress vibrations of the pair of brake pads 3, 4 due to symmetrical motions by varying the easiness of vibrations between the pair of brake pads 3, 4 as described above. Thus, the disc brake device 601 is able to suppress noise during braking, such as brake squeal.

Seventh Embodiment

Figure 12:
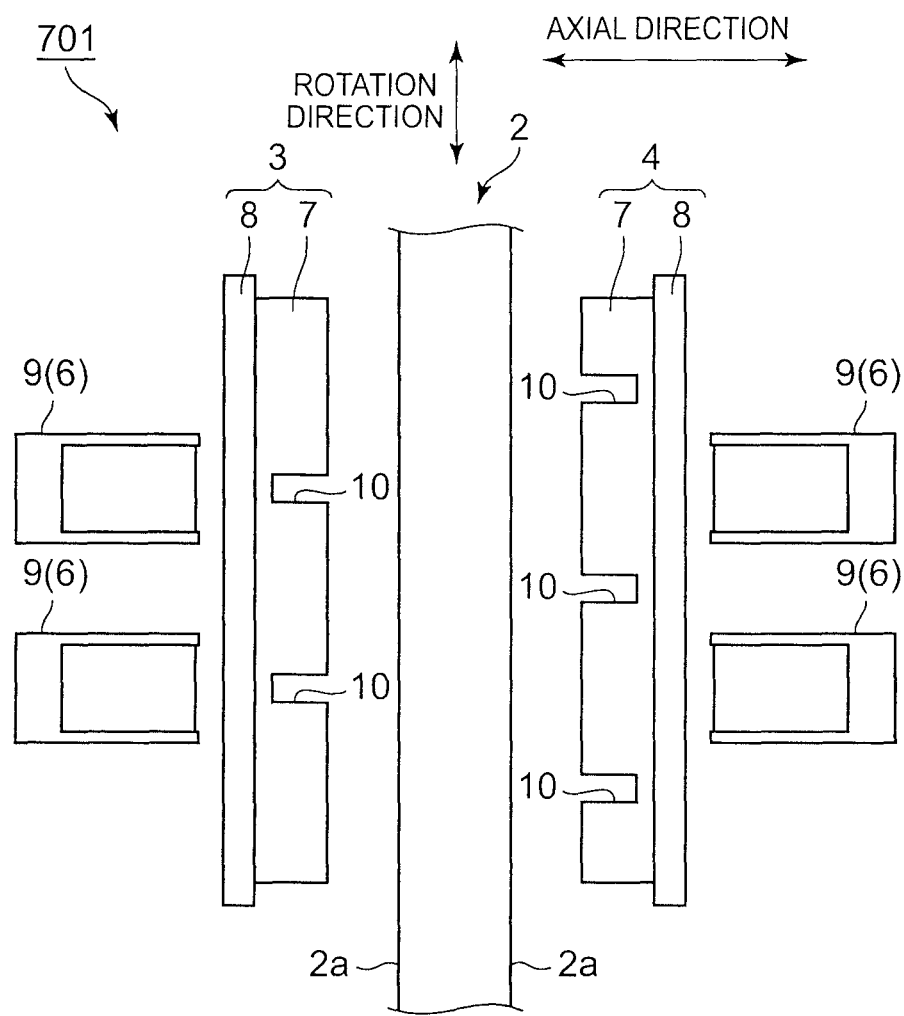
FIG. 12 is a schematic cross-sectional view that shows the schematic configuration of a disc brake device according to a seventh embodiment of the invention.

FIG. 12 is a schematic cross-sectional view that shows the schematic configuration of a disc brake device according to a seventh embodiment. The disc brake device and a pair of brake pads according to the seventh embodiment differ from those of the first, second, third, fourth, fifth or sixth embodiment in the number of the pistons and the number of the slits.

The disc brake device 701 according to the present embodiment, shown in FIG. 12, includes a piston-opposed four-pot-type caliper 5 in which the pistons 9 are arranged two by two on each side of the disc rotor 2. In the disc brake device 701, the two slits 10 are provided in the friction material 7 of the brake pad 3, and the three slits 10 are provided in the friction material 7 of the brake pad 4.

According to the present embodiment, the two slits 10 are formed in the friction material 7 of the brake pad 3 so as to pass through' any one of the center pressing portion (not shown). According to the present embodiment, the three slits 10 are formed in the friction material 7 of the brake pad 4 so as not to pass through any one of the pressing portions. That is, according to the present embodiment, the number of the slits 10 passing through any one of the pressing portions 11 is two and the number of the slits 10 not passing through any one of the pressing portions 11 is 0 in the brake pad 3, whereas the number of the slits 10 passing through any one of the pressing portions 11 is 0 and the number of the slits 10 not passing through any one of the pressing portions 11 is three in the brake pad 4. In other words, the disc brake device 701 according to the present embodiment is configured such that the brake pad 4 that serves as the outer pad has a larger number of the slits 10 not passing through any one of the pressing portions.

The thus configured disc brake device 701 is able to vary the easiness of vibrations between the pair of brake pads 3, 4 during braking because the number of the slits 10 of one of the pair of brake pads 3, 4 not passing through any one of the pressing portions is different from the number of the slits 10 of the other one of the pair of brake pads 3, 4 not passing through any one of the pressing portions. That is, the brake pad 4 has a relatively larger number of the slits 10 not passing through any one of the pressing portions, so the brake pad 4 relatively easily carries out bending vibrations (large vibrations) during braking, the period of bending vibrations becomes relatively long, in other words, there is a tendency that the vibration speed is slow and the frequency is low. On the other hand, because the brake pad 3 has a relatively smaller number of the slits 10 not passing through any one of the pressing portions, bending vibrations are relatively hard to occur (small vibrations) during braking, and the period of bending vibrations becomes relatively short, in other words, there is a tendency that the vibration speed is fast and the frequency is high. As a result, the disc brake device 701 is able to suppress vibrations of the pair of brake pads 3, 4 due to symmetrical motions by varying the easiness of vibrations between the pair of brake pads 3, 4 as described above. Thus, the disc brake device 701 is able to suppress noise during braking, such as brake squeal.

Eighth Embodiment

Figure 13:
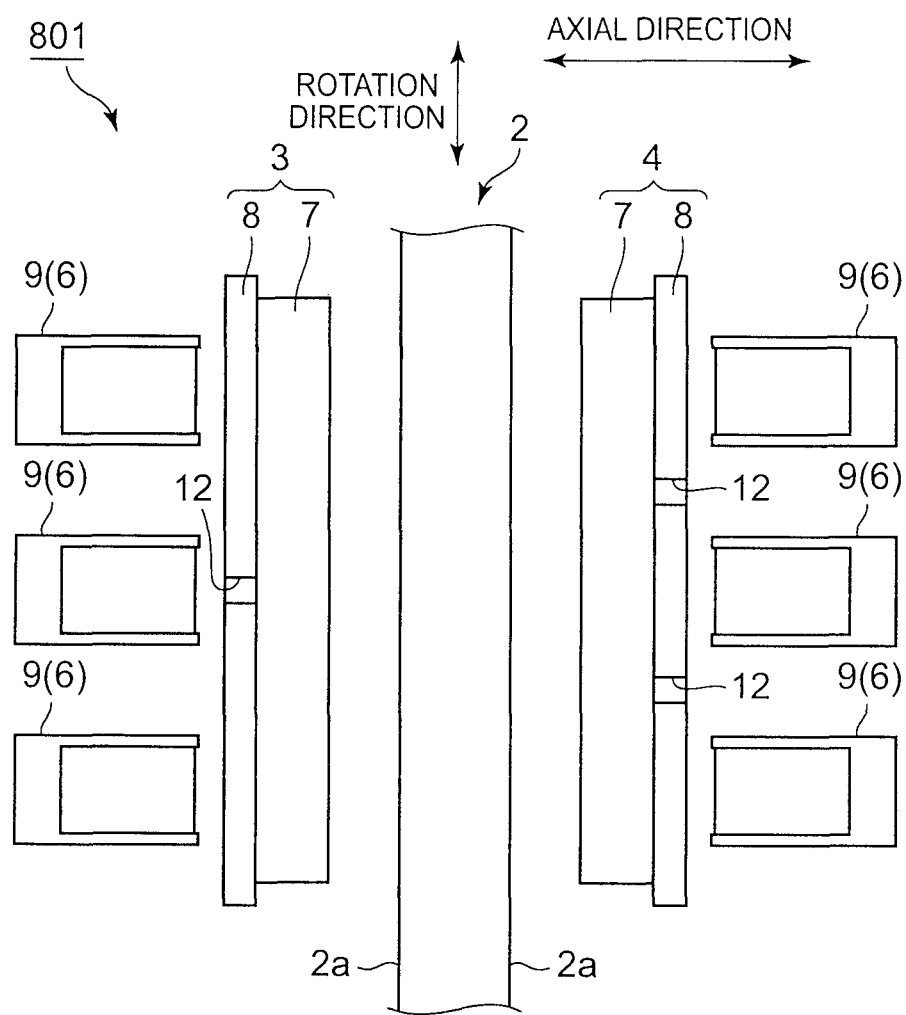
FIG. 13 is a schematic cross-sectional view that shows the schematic configuration of a disc brake device according to an eighth embodiment of the invention.

FIG. 13 is a schematic cross-sectional view that shows the schematic configuration of a disc brake device according to an eighth embodiment. The disc brake device and a pair of brake pads according to the eighth embodiment differ from those of the first, second, third, fourth, fifth, sixth or seventh embodiment in that no slit is provided.

The disc brake device 801 according to the present embodiment, shown in FIG. 13, attempts to suppress noise by optimally setting the positional relationship between the positions of the holes 12 provided in the pair of brake pads 3, 4 and the pressing portions 11 (see FIG. 3 and FIG. 4) without providing the slits 10 (see FIG. 2, and the like) in the pair of brake pads 3, 4. The disc brake device 801 has substantially similar configuration to that of the above-described disc brake device 201 (see FIG. 7) except that no slit 10 is provided.

The thus configured disc brake device 801 is able to vary the easiness of vibrations between the pair of brake pads 3, 4 during braking because the number of the holes 12 provided outside the pressing portions 11 in one of the pair of brake pads 3, 4 is different from the number of the holes 12 provided outside the pressing portions 11 in the other one of the pair of brake pads 3, 4. That is, because the brake pad 4 has a relatively larger number of the holes 12 provided outside the pressing portions 11, the number of the holes 12 that are not pressed by the pistons 9 during braking becomes relatively large, so bending stiffness during braking becomes relatively low. Therefore, the brake pad 4 easily carries out bending vibrations (large vibrations) during braking, and is allowed to have a low frequency. On the other hand, because the brake pad 3 has a relatively small number of the holes 12 provided outside the pressing portions 11, the surroundings of the holes 12 are allowed to be pressed by the pistons 9 during braking, so the brake pad 3 is able to keep relatively high bending stiffness. Thus, as compared to the brake pad 4, the brake pad 3 is able to make bending vibrations hard to occur (small vibrations) during braking, and is able to have a high frequency.

Thus, the disc brake device 801 and the pair of brake pads 3, 4 are able to vary the easiness of vibrations between the pair of brake pads 3, 4 during braking, and are able to suppress vibrations of the pair of brake pads 3, 4 due to symmetrical motions during braking, so it is possible to suppress noise during braking.

The disc brake devices and the pairs of brake pads according to the above-described embodiments of the invention are not limited to the above-described embodiments; various modifications are applicable within the scope recited in the appended claims. A disc brake device and a pair of brake pad according to an embodiment of the invention may be configured by combining the components of the above-described embodiments as needed.

In the above description, in the pair of brake pads 3, 4, the brake pad 3 serves as the inner pad, and the brake pad 4 serves as the outer pad; instead, the relationship of them may be opposite. The pair of brake pads 3, 4 may be configured such that the brake pad 4 serves as the inner pad, the brake pad 3 serves as the outer pad and the inner pad has a larger number of the slits 10 not passing through any one of the pressing portions 11.

In a disc brake device according to a reference example, in the pair of brake pads 3, 4, where the number of the slits 10 passing through any one of the pressing portions 11, the number of the slits 10 not passing through any one of the pressing portions 11, installation positions of these slits 10, and the like, are equivalent therebetween, the groove depth t1 of each of the slits 10 of the brake pad 3 may be varied from the groove depth t2 of each of the slits 10 of the brake pad 4.

The invention claimed is:

1. A disc brake device comprising:
 a disc rotor configured to be rotatable around its rotation axis;
 a pair of brake pads provided opposite each other on both sides of the disc rotor in an axial direction along the rotation axis; and
 a pressing mechanism configured to press the pair of brake pads against the disc rotor from both sides of the disc rotor using pistons provided opposite to each other on both sides of the disc rotor in the axial direction, wherein each brake pad of the pair of brake pads has a friction material facing a corresponding one of friction faces of the disc rotor, and a number of first slits provided in the friction material of one brake pad of the pair of brake pads and not passing through any one of pressing portions that are pressed by the pistons is different from a number of second slits provided in the friction material of the other brake pad and not passing through any one of the pressing portions that are pressed by the pistons, wherein each of the pair of brake pads has at least one slit in the corresponding friction material.

2. The disc brake device according to claim 1, wherein each of the pair of brake pads has at least one slit in the corresponding friction material, and a groove depth of each first slit of one of the pair of brake pads, having a larger number of slits not passing through any one of the pressing portions, is larger than a groove depth of each second slit of the other one of the pair of brake pads, having a smaller number of slits not passing through any one of the pressing portions.

3. The disc brake device according to claim 1, wherein a mass of one of the pair of brake pads, having a larger number of first slits not passing through any one of the pressing portions, is larger than a mass of the other one of the pair of brake pads, having a smaller number of second slits not passing through any one of the pressing portions.

4. The disc brake device according to claim 1, wherein each of the pair of brake pads has a back plate to which the corresponding friction material is fixed, and a number of first holes provided in the back plate of one of the pair of brake pads and provided outside the pressing portions that are pressed by the pistons is different from a number of second holes provided in the back plate of the other one of the pair of brake pads and provided outside the pressing portions that are pressed by the pistons.

5. The disc brake device according to claim 1, wherein each pressing portion is a region to which a corresponding one of the pistons is projected in the axial direction.

6. The disc brake device according to claim 1, wherein a groove depth of each first slits is substantially equivalent to a groove depth of each second slits.

7. The disc brake device according to claim 1, wherein one of the pair of brake pads has a number of slits greater than a number of slits on the other brake pad.

8. The disc brake device according to claim 1, wherein the first slits and the second slits are substantially parallel to each other.

9. The disc brake device according to claim 1, wherein the first slits are angled with respect to the second slits.

10. A pair of brake pads that are provided opposite to each other on both sides of a disc rotor in an axial direction along a rotation axis of the disc rotor and that are pressed against the disc rotor from both sides of the disc rotor with use of pistons provided so as to face each other on both sides of the disc rotor in the axial direction, the pair of brake pads comprising:

friction materials, respectively, each friction material facing a corresponding one of friction faces of the disc rotor, wherein a number of first slits provided in the friction material of one brake pad of the pair of brake pads and not passing through any one of pressing portions that are pressed by the pistons is different from a number of second slits provided in the friction material of the other one of the brake pads and not passing through any one of the pressing portions that are pressed by the pistons, wherein each of the pair of brake pads has at least one slit in the corresponding friction material.

* * * * *